United States Patent
Zhou (10) Patent No.: US 11,689,712 B2
(45) Date of Patent: *Jun. 27, 2023

(54) VIRTUAL MEMORY ACCESS BANDWIDTH VERIFICATION (VMBV) IN VIDEO CODING

(71) Applicant: Texas Instruments Incorporated, Dallas, TX (US)

(72) Inventor: Minhua Zhou, San Diego, CA (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/807,697

(22) Filed: Mar. 3, 2020

(65) Prior Publication Data

US 2020/0204795 A1 Jun. 25, 2020

Related U.S. Application Data

(63) Continuation of application No. 15/700,634, filed on Sep. 11, 2017, now Pat. No. 10,609,366, which is a continuation of application No. 13/645,324, filed on Oct. 4, 2012, now Pat. No. 9,762,899.

(60) Provisional application No. 61/589,615, filed on Jan. 23, 2012, provisional application No. 61/543,234, filed on Oct. 4, 2011.

(51) Int. Cl.
*H04N 19/00* (2014.01)
*H04N 19/433* (2014.01)

(52) U.S. Cl.
CPC .......... *H04N 19/00* (2013.01); *H04N 19/433* (2014.11)

(58) Field of Classification Search
CPC ............................ H04N 19/00; H04N 19/433
See application file for complete search history.

(56) References Cited

U.S. PATENT DOCUMENTS

| | | | | |
|---|---|---|---|---|
| 5,920,701 A | * | 7/1999 | Miller | H04L 47/29 709/228 |
| 6,028,612 A | * | 2/2000 | Balakrishnan | H04N 19/423 348/716 |
| 6,091,777 A | * | 7/2000 | Guetz | H04N 19/635 375/240.03 |
| 6,104,416 A | * | 8/2000 | McGuinness | H04N 21/4143 345/571 |
| 6,154,826 A | * | 11/2000 | Wulf | G06F 9/3455 711/204 |

(Continued)

FOREIGN PATENT DOCUMENTS

WO   WO-2012114725 A1  *  8/2012  ............... G06T 9/00

OTHER PUBLICATIONS

Keiichi Chono et al, "JCT-VC AHG Report: Memory Compression", JCTVC-C007, Joint Collaborative Team on Video Coding (JCT-VC) of ITU-T SG16 WP3 and ISO/IEC JTC1/SC29/WG11, Oct. 7-15, 2010, Guangzhou, China, 10 pages.

(Continued)

*Primary Examiner* — Reza Aghevli
(74) *Attorney, Agent, or Firm* — Carl G. Peterson; Frank D. Cimino (57) ABSTRACT

A method is provided that includes determining a target picture virtual memory access (VMA) bandwidth rate, wherein the target picture VMA bandwidth rate indicates a maximum VMA bandwidth rate for motion compensation of a picture, and verifying the target picture VMA bandwidth rate for a compressed video bit stream.

15 Claims, 8 Drawing Sheets

(56) References Cited

U.S. PATENT DOCUMENTS

| | | | | |
|---|---|---|---|---|
| 6,240,103 | B1* | 5/2001 | Schoenblum | H04B 7/2612 375/E7.269 |
| 6,470,050 | B1* | 10/2002 | Ohtani | H04N 19/51 375/E7.102 |
| 6,674,911 | B1* | 1/2004 | Pearlman | G06T 9/40 375/240.19 |
| 8,249,070 | B2* | 8/2012 | Song | H04N 19/132 370/395.64 |
| 9,762,899 | B2 | 9/2017 | Zhou | |
| 9,847,970 | B1* | 12/2017 | Zipperer | H04L 63/1458 |
| 10,705,985 | B1* | 7/2020 | Pollak | G06F 13/1642 |
| 2004/0190622 | A1* | 9/2004 | Schutten | H04N 19/51 375/E7.102 |
| 2005/0047507 | A1* | 3/2005 | Ju | H04N 19/159 375/E7.25 |
| 2005/0195902 | A1* | 9/2005 | Chung | H04N 19/44 375/240.03 |
| 2006/0140270 | A1* | 6/2006 | Li | H04N 19/172 375/E7.157 |
| 2006/0155915 | A1* | 7/2006 | Pereira | H04L 45/00 711/100 |
| 2006/0233262 | A1* | 10/2006 | Ridge | H04N 19/34 375/240.25 |
| 2007/0160151 | A1* | 7/2007 | Bolton | H04N 7/24 375/240.25 |
| 2007/0189395 | A1* | 8/2007 | Wang | H04N 19/122 375/E7.17 |
| 2008/0192985 | A1* | 8/2008 | Shimazu | H04N 19/56 375/E7.122 |
| 2009/0175343 | A1* | 7/2009 | Pearlstein | H04N 19/51 375/E7.125 |
| 2010/0002776 | A1* | 1/2010 | Lee | H04N 19/573 375/240.25 |
| 2010/0103195 | A1* | 4/2010 | MacInnis | H04N 5/45 345/629 |
| 2010/0150223 | A1* | 6/2010 | Nagaraj | H04N 19/70 375/E7.076 |
| 2010/0150242 | A1* | 6/2010 | Ozawa | H04N 19/91 375/E7.123 |
| 2010/0226428 | A1* | 9/2010 | Thevathasan | H04L 65/765 375/E7.026 |
| 2010/0226444 | A1* | 9/2010 | Thevathasan | H04N 21/2381 375/E7.026 |
| 2011/0187729 | A1* | 8/2011 | Huang | G06F 13/18 345/535 |
| 2011/0228858 | A1* | 9/2011 | Budagavi | H04N 19/70 375/E7.027 |
| 2012/0230393 | A1* | 9/2012 | Naing | H04N 19/117 375/E7.125 |
| 2012/0314026 | A1* | 12/2012 | Chen | H04N 19/172 375/E7.076 |

OTHER PUBLICATIONS

Madhukar Budagavi, "A Simple Cache Model for Measuring Motion Compensation Bandwidth", JCTVC-C228, Joint Collaborative Team on Video Coding (JCT-VC) of ITU-T SG16 WP3 and ISO/IEC JTC1/SC29/WG11, Oct. 7-15, 2010, Guangzhou, China, 2 pages.

Thomas Wiegand et al., "WD3: Working Draft 3 of High-Efficiency Video Coding", JCTVC-E603, Joint Collaborative Team on Video Coding (JCT-VC) of ITU-T SG16 WP3 and ISO/IEC JTC1/SC29/WG11, Mar. 16-23, 2011, Geneva, Switzerland, 215 pages.

Benjamin Bross et al., "WD4: Working Draft 4 of High-Efficiency Video Coding" JCTVC-F803_d6, Joint Collaborative Team on Video Coding (JCT-VC) of ITU-T SG16 WP3 and ISO/IEC JTC1/SC29/WG11, Jul. 14-22, 2011, Torino, Italy, 229 pages.

Minhua Zhou, Virtual Motion Compensation Memory Bandwidth Verifier (VMBV), JCTVC-G095, Joint Collaborative Team on Video Coding (JCT-VC) of ITU-T SG16 WP3 and ISO/IEC JTC1/SC29/WG11, Nov. 19-30, 2011, Geneva, Switzerland, 6 pages.

Minhua Zhou, Virtual Motion Compensation Memory Bandwidth Verifier (VMBV), JCTVC-G095 presentation, Joint Collaborative Team on Video Coding (JCT-VC) of ITU-T SG16 WP3 and ISO/IEC JTC1/SC29/WG11, Nov. 19-30, 2011, Geneva, Switzerland, 6 pages.

Benjamin Bross et al., "WD5: Working Draft 5 of High-Efficiency Video Coding", JCTVC-G1103_d9, Joint Collaborative Team on Video Coding (JCT-VC) of ITU-T SG16 WP3 and ISO/IEC JTC1/SC29/WG11, Nov. 21-30, 2011, Geneva, Switzerland, 237 pages.

Hyungjoon Kim and Minhua Zhou, AHG7: Feasibility Study Results on Virtual Motion Compensation Memory Bandwidth Verifier (VMBV), JCTVC-H0089, Joint Collaborative Team on Video Coding (JCT-VC) of ITU-T SG16 WP3 and ISO/IEC JTC1/SC29/WG11, Feb. 1-10, 2012, San Jose, CA, 5 pages.

Benjamin Bross et al., "High Efficiency Video Coding (HEVC) Text Specification Draft 6", JCTVC-H1003, Joint Collaborative Team on Video Coding (JCT-VC) of ITU-T SG16 WP3 and ISO/IEC JTC1/SC29/WG11, Nov. 21-30, 2011, Geneva, Switzerland, 259 pages.

Benjamin Bross et al., "High Efficiency Video Coding (HEVC) Text Specification Draft 7", JCTVC-11003_d1, Joint Collaborative Team on Video Coding (JCT-VC) of ITU-T SG16 WP3 and ISO/IEC JTC1/SC29/WG11, Apr. 27-May 7, 2012, Geneva, Switzerland, 272 pages.

Benjamin Bross et al., "High Efficiency Video Coding (HEVC) Text Specification Draft 8", JCTVC-J1003_d7, Joint Collaborative Team on Video Coding (JCT-VC) of ITU-T SG16 WP3 and ISO/IEC JTC1/SC29/WG11, Jul. 11-20, 2012, Stockholm, Sweden, 260 pages.

"TMS320DM6467 Digital Media System-on-Chip", SPRS403G, Texas Instruments Incorporated, Dec. 2007, revised Oct. 2010, 355 pages.

* cited by examiner

| LCU0 (w0) | LCU1 (w1) | LCU2 (w2) | LCU3 (w3) |
|---|---|---|---|
| LCU4 (w4) | LCU5 (w5) | LCU6 (w6) | LCU7 (w7) |
| LCU8 (w8) | LCU9 (w9) | LCU10 (w10) | LCU11 (w11) |
| LCU12 (w12) | LCU13 (w13) | LCU14 (w14) | LCU15 (w15) |

VIRTUAL MEMORY ACCESS BANDWIDTH VERIFICATION (VMBV) IN VIDEO CODING

CROSS-REFERENCE TO RELATED APPLICATIONS

This application is a continuation of U.S. patent application Ser. No. 15/700,634, filed Sep. 11, 2017, which is a continuation of U.S. patent application Ser. No. 13/645,324 filed Oct. 4, 2012, now U.S. Pat. No. 9,762,899, issued Sep. 12, 2017, which claims the benefit of U.S. Provisional Patent Application Ser. No. 61/543,234 filed Oct. 4, 2011, and U.S. Provisional Patent Application Ser. No. 61/589,615 filed Jan. 23, 2012, all of which are incorporated herein by reference in their entirety.

BACKGROUND OF THE INVENTION

Field of the Invention

Embodiments of the present invention generally relate to virtual memory access bandwidth verification in video coding.

Description of the Related Art

The Joint Collaborative Team on Video Coding (JCT-VC) of ITU-T WP3/16 and ISO/IEC JTC 1/SC 29/WG 11 is currently developing the next-generation video coding standard referred to as High Efficiency Video Coding (HEVC). Similar to previous video coding standards such as H.264/AVC, HEVC is based on a hybrid coding scheme using block-based prediction and transform coding. First, the input signal is split into rectangular blocks that are predicted from the previously decoded data by either motion compensated (inter) prediction or intra prediction. The resulting prediction error is coded by applying block transforms based on an integer approximation of the discrete cosine transform, which is followed by quantization and entropy coding of the transform coefficients.

The design goal for development of this standard is that HEVC should at least 50% more efficient than the current H.264/AVC high profile. To improve coding efficiency, several coding efficiency enhancement tools are proposed in this new standard, among them the use of a 7-tap or 8-tap interpolation filter for luminance motion compensation rather than the 6-tap interpolation filter specified in H.264/AVC and 4-tap interpolation filter for chrominance motion compensation rather than the bi-linear interpolation filter specified in H.264/AVC. While the longer interpolation filters specified for HEVC improve the accuracy of inter-prediction, they also increase the motion compensation memory bandwidth requirements of an HEVC decoder.

SUMMARY

Embodiments of the present invention relate to methods, apparatus, and computer readable media for virtual memory access bandwidth verification in video coding. In one aspect, a method is provided that includes determining a target picture virtual memory access (VMA) bandwidth rate, wherein the target picture VMA bandwidth rate indicates a maximum VMA bandwidth rate for motion compensation of a picture, and verifying the target picture VMA bandwidth rate for a compressed video bit stream.

In one aspect, an apparatus is provided that includes means for determining a target picture virtual memory access (VMA) bandwidth rate, wherein the target picture VMA bandwidth rate indicates a maximum VMA bandwidth rate for motion compensation of a picture, and means for verifying the target picture VMA bandwidth rate for a compressed video bit stream.

In one aspect, a non-transitory computer readable medium storing software instructions is provided. The instructions, when executed by a processor, cause a method to be performed that includes means for determining a target picture virtual memory access (VMA) bandwidth rate, wherein the target picture VMA bandwidth rate indicates a maximum VMA bandwidth rate for motion compensation of a picture, and means for verifying the target picture VMA bandwidth rate for a compressed video bit stream.

BRIEF DESCRIPTION OF THE DRAWINGS

Particular embodiments will now be described, by way of example only, and with reference to the accompanying drawings.

DETAILED DESCRIPTION OF EMBODIMENTS OF THE INVENTION

Specific embodiments of the invention will now be described in detail with reference to the accompanying figures. Like elements in the various figures are denoted by like reference numerals for consistency.

As used herein, the term "picture" may refer to a frame or a field of a frame. A frame is a complete image captured during a known time interval. For convenience of description, embodiments of the invention are described herein in reference to HEVC. One of ordinary skill in the art will understand that embodiments of the invention are not limited to HEVC.

In HEVC, a largest coding unit (LCU) is the base unit used for block-based coding. A picture is divided into non-overlapping LCUs. That is, an LCU plays a similar role in coding as the macroblock of H.264/AVC, but it may be larger, e.g., 32×32, 64×64, etc. An LCU may be partitioned into coding units (CUs) and CUs may be partitioned into prediction units (PUs). A CU is a block of pixels within an LCU and the CUs within an LCU may be of different sizes. The partitioning is a recursive quadtree partitioning. The quadtree is split according to various criteria until a leaf is reached, which is referred to as the coding node or coding unit. The maximum hierarchical depth of the quadtree is determined by the size of the smallest CU (SCU) specified for a picture. In recent versions of HEVC, the minimum CU size permitted is 8×8.

Figure 1:
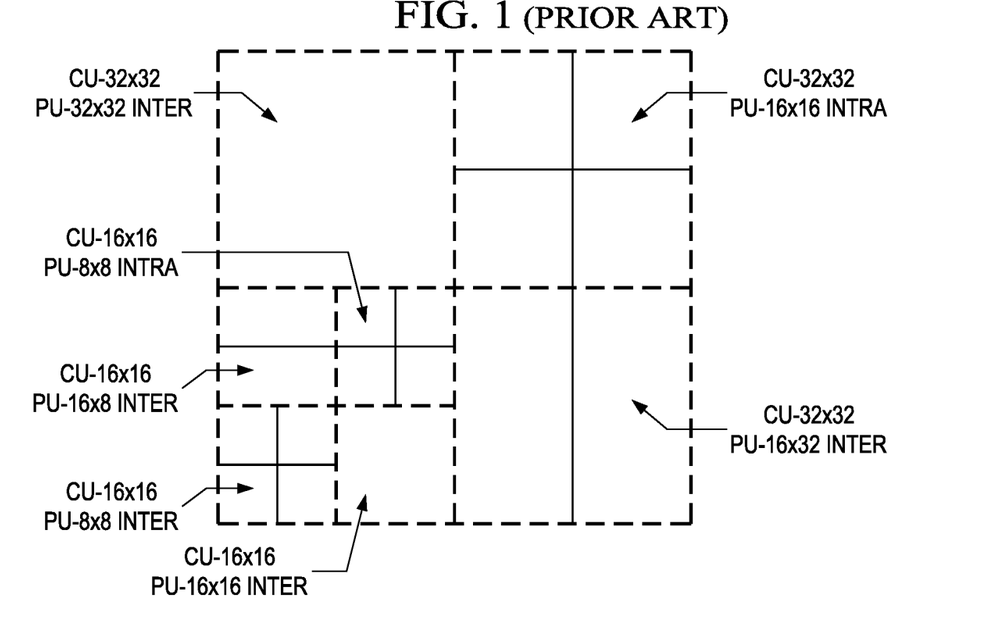
FIG. 1 is an example of quadtree based largest coding unit (LCU) decomposition.

The coding node is the root node of two trees, a prediction tree and a transform tree. A prediction tree specifies the position and size of prediction units (PU) for a CU. A transform tree specifies the position and size of transform units (TU) for a CU. A transform unit may not be larger than a CU and the size of a transform unit may be 4×4, 8×8, 16×16, and 32×32. The sizes of the TUs and PUs for a CU are determined by the video encoder during prediction based on minimization of rate/distortion costs. FIG. 1 shows an example of a quadtree based LCU to CU/PU decomposition structure in which the size of the SCU is 16×16 and the size of the LCU is 64×64.

Various versions of HEVC are described in the following documents, which are incorporated by reference herein: T. Wiegand, et al., "WD3: Working Draft 3 of High-Efficiency Video Coding," JCTVC-E603, Joint Collaborative Team on Video Coding (JCT-VC) of ITU-T SG16 WP3 and ISO/IEC JTC1/SC29/WG11, Geneva, CH, Mar. 16-23, 2011 ("WD3"), B. Bross, et al., "WD4: Working Draft 4 of High-Efficiency Video Coding," JCTVC-F803_d6, Joint Collaborative Team on Video Coding (JCT-VC) of ITU-T SG16 WP3 and ISO/IEC JTC1/SC29/WG11, Torino, IT, Jul. 14-22, 2011 ("WD4"), B. Bross. et al., "WD5: Working Draft 5 of High-Efficiency Video Coding," JCTVC-G1103_d9, Joint Collaborative Team on Video Coding (JCT-VC) of ITU-T SG16 WP3 and ISO/IEC JTC1/SC29/WG11, Geneva, CH, Nov. 21-30, 2011 ("WD5"), B. Bross, et al., "High Efficiency Video Coding (HEVC) Text Specification Draft 6," JCTVC-H1003, Joint Collaborative Team on Video Coding (JCT-VC) of ITU-T SG16 WP3 and ISO/IEC JTC1/SC29/WG1, Geneva, CH, Nov. 21-30, 2011 ("HEVC Draft 6"), B. Bross, et al., "High Efficiency Video Coding (HEVC) Text Specification Draft 7," JCTVC-11003_d1, Joint Collaborative Team on Video Coding (JCT-VC) of ITU-T SG16 WP3 and ISO/IEC JTC1/SC29/WG1, Geneva, CH, Apr. 17-May 7, 2012 ("HEVC Draft 7"), and B. Bross, et al., "High Efficiency Video Coding (HEVC) Text Specification Draft 8," JCTVC-J1003_d7, Joint Collaborative Team on Video Coding (JCT-VC) of ITU-T SG16 WP3 and ISO/IEC JTC1/SC29/WG1, Stockholm, SE, Jul. 11-20, 2012 ("HEVC Draft 8").

Some aspects of this disclosure have been presented to the JCT-VC in M. Zhou, "Virtual Motion Compensation Memory Bandwidth Verifier (VMBV)," JCTVC-G095, Joint Collaborative Team on Video Coding (JCT-VC) of ITU-T SG16 WP3 and ISO/IEC JTC1/SC29/WG11, Geneva, CH, Nov. 19-30, 2011, and H. Kim and M. Zhou, "AHG7: Feasibility Study Results on Virtual Motion Compensation Memory Bandwidth Verifier (VMBV)," JCTVC-H0089, Joint Collaborative Team on Video Coding (JCT-VC) of ITU-T SG16 WP3 and ISO/IEC JTC1/SC29/WG11, San Jose, Calif., Feb. 1-10, 2012, which are incorporated by reference herein in their entirety.

As previously mentioned, HEVC, as described in WD4 (and later versions), specifies a 7-tap or 8-tap interpolation filter for luminance motion compensation and a 4-tap interpolation filter for chrominance motion compensation. The use of these longer filters increases the memory access bandwidth requirements for decoding over that needed for the shorter interpolation filters used in H.264/AVC. More specifically, the worst case memory access bandwidth requirements for HEVC motion compensation increase by approximately 41% as compared to the requirements of H.264/AVC (assuming 4×8 or 8×4 as the minimum PU size). This is particularly an issue for embedded decoding systems as the reference data needed for motion compensation is typically stored in external memory and read into on-chip memory as needed for motion compensation. Herein, bandwidth is measured in units of bytes or bits and bandwidth rate is measured in unit of bytes or bits per second.

Figure 2:
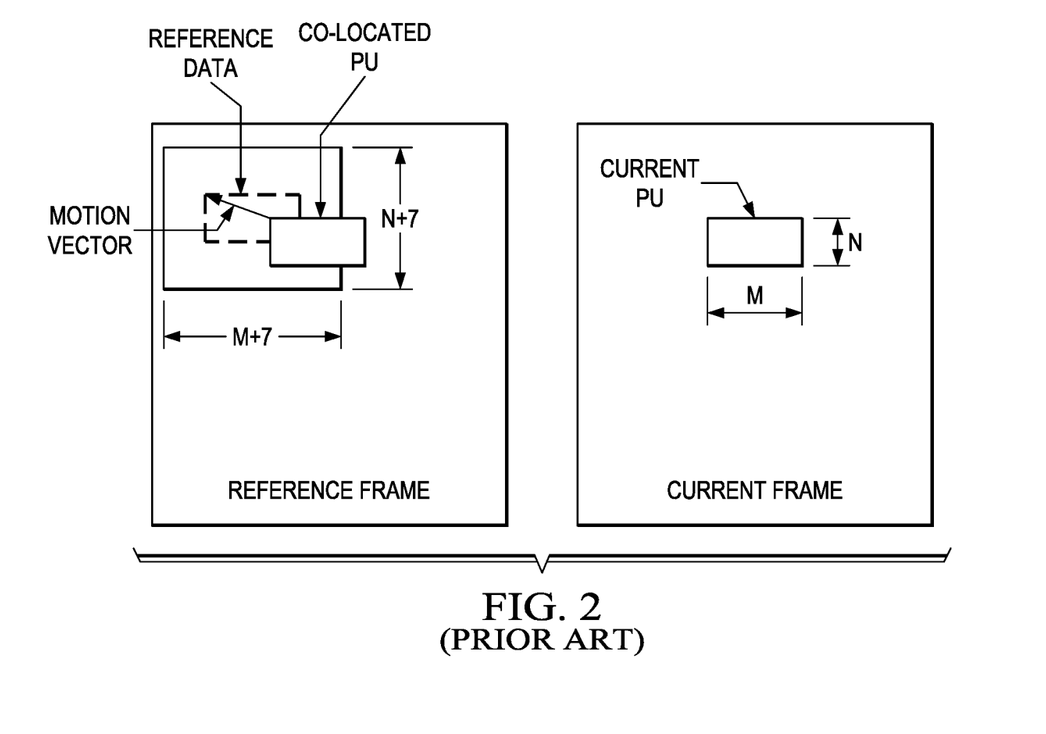
FIGS. 2-4 are examples illustrating memory access bandwidth requirements for motion compensation.
Figure 3:
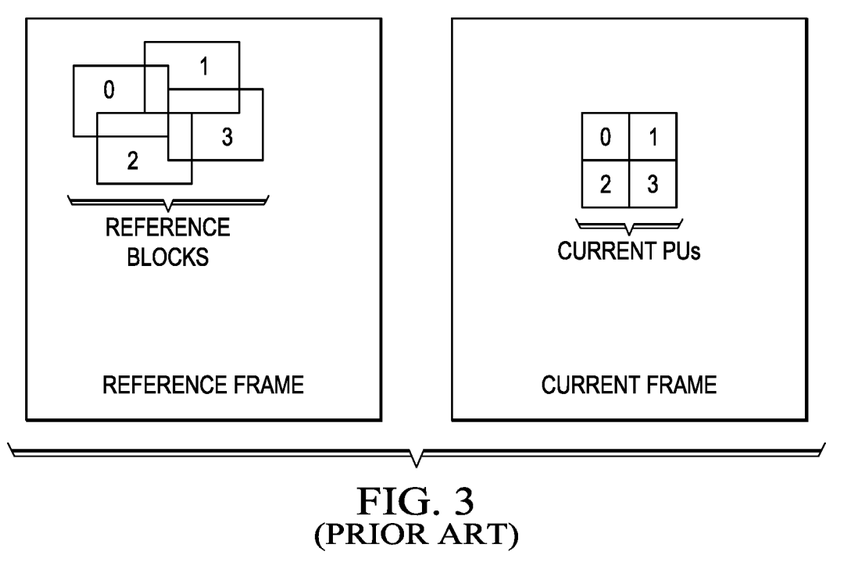
Figure 4:
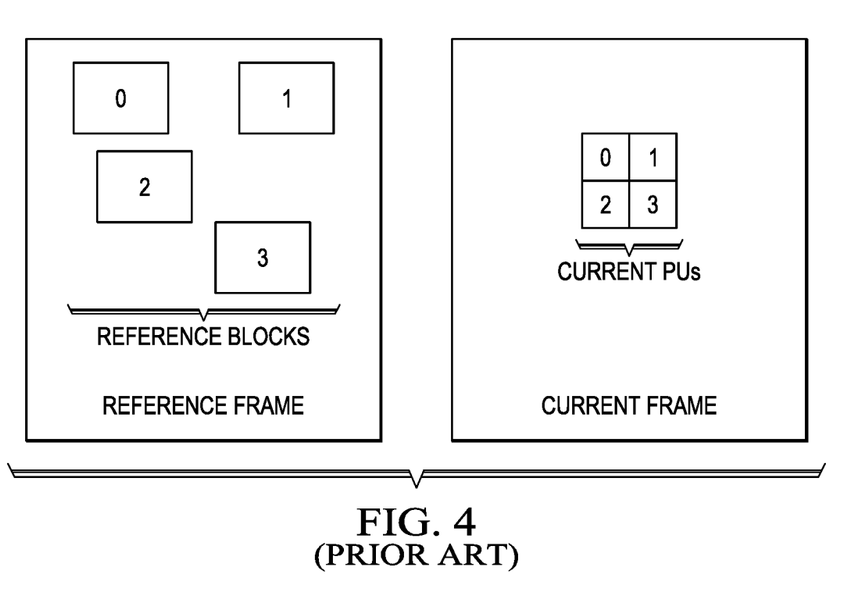

FIGS. 2-4 are examples illustrating memory bandwidth issues for luminance motion compensation using an 8-tap interpolation filter. As shown in FIG. 2, for motion compensation of a PU of size M×N, a block of reference data of size (M+7)×(N+7) surrounding the co-located PU in a reference picture is read into on-chip memory from the external memory storing the reference data. For typical cases, motion vectors from PU to PU are often similar. Therefore, there may be considerable overlap among the reference blocks of neighboring PUs. The overlapping of the reference blocks for four neighboring PUs is illustrated in the example of FIG. 3. The overlapping of reference block can be leveraged such that the content of reference blocks from neighboring PUs is partially re-used for the motion compensation of a PU if a reference block caching mechanism is implemented. The reference block caching may reduce the overall memory access bandwidth requirements for motion compensation because the decoder can avoid fully loading the reference blocks for many PUs.

However, in the worst case, an encoder can generate a motion vector field during motion estimation such that there is no overlap in the reference blocks for neighboring PUs. Such cases break the overlap assumption of the reference block caching model, and lead to much higher memory access bandwidth requirements. FIG. 4 depicts such an example, in which the reference blocks for the four neighboring PUs are completely separate. There is a large difference in the memory access bandwidth consumed between the typical cases such as those of FIG. 3 and the worst cases such as those of FIG. 4. This large difference in memory access bandwidth causes unnecessary high decoder cost without actual coding efficiency benefit, as the decoder designs have to cover the worst case. An early study documented in M. Zhou and M. Budagavi, "Testing Results of TI Reference Frame Compression Algorithm using TMuC-0.9", JCTVC-D023, Joint Collaborative Team on Video Coding (JCT-VC) of ITU-T SG16 WP3 and ISO/IEC JTC1/SC29/WG11, Daegu, Korea, 20-28 Jan. 2011, shows that such the memory access bandwidth differences may range from 2× to 3×.

Memory access bandwidth for motion compensation is known to be a bottleneck for decoder design. This bottleneck becomes worse as video resolution increases. This is a concern as video resolutions are moving from high definition (HD, e.g., 1080p@60) to Ultra-HD (e.g., 4K×2K @60). Therefore, improvements in memory access bandwidth management for motion compensation are desirable in order to narrow the memory access bandwidth gap between the typical and worst accesses and to lower decoder cost without harming coding efficiency.

Embodiments of the invention provide for the imposition of memory access bandwidth constraints for motion compensation (for both luma and chroma) on encoded bit streams, e.g., HEVC bit streams. More specifically, to help prevent an encoder from generating bit streams with cases in which there are many instances of no overlapping reference blocks among neighboring PUs as illustrated in FIG. 4, virtual memory access (VMA) bandwidth verification is performed to impose a target VMA bandwidth rate on the bit stream as it is generated by an encoder. In general, a reasonable VMA bandwidth rate is determined for the encoder and the encoder operates to meet the rate. The encoder may be able to generate motion vectors for some PUs that lead to no reference block overlap among the PUs, but the rate constraint may stop the encoder from generating a motion vector field that leads to no reference block overlap among any PUs in a picture. Further, in some embodiments, to avoid decoding bit streams that do not conform to a target VMA bandwidth rate, VMA bandwidth verification is performed verify that the target VMA bandwidth rate is being met.

As used herein, VMA bandwidth is the amount of reference data that has to be fetched from off-chip (external) memory for a decoder to perform motion compensation (for both luma and chroma) for a picture or a coding block of a picture, e.g., an LCU or PU. VMA bandwidth rate is the rate of reading reference data from off-chip memory. For purposes of explanation herein, VMA bandwidth may be assumed to be measured in bytes and VMA bandwidth rate in units of bytes per second. Other units of measure may be used, e.g., bits and bits per second.

In embodiments of the invention, a target VMA bandwidth rate for motion compensation (for both luma and chroma) of a picture is determined. As is explained in more detail herein, this target VMA bandwidth rate may be a maximum VMA bandwidth rate specified by the video coding standard, e.g., HEVC. A VMA bandwidth measurement algorithm is also defined by the video coding standard. As is explained in more detail below, the VMA bandwidth measurement algorithm quantifies, e.g., in bytes, the VMA bandwidth consumed for motion compensation (for both luma and chroma), e.g., for a PU, according to a normative decoder virtual memory access model. For VMA bandwidth verification, conformance to the specified target VMA bandwidth rate is imposed on an encoded bit stream in an encoder, and, in some embodiments, conformance is verified in a decoder.

More specifically, in some embodiments, in an encoder, the consumed VMA bandwidth per LCU of a picture, as measured using the VMA bandwidth measurement algorithm, is controlled such that the total consumed VMA bandwidth for the picture does not exceed a target picture VMA bandwidth determined from the target picture VMA bandwidth rate. In some embodiments, in a decoder, the consumed VMA bandwidth per picture, as measured using the VMA bandwidth measurement algorithm, is verified against a target picture VMA bandwidth determined from a target picture VMA bandwidth rate. In some embodiments, in a decoder, the consumed VMA bandwidth per picture, as measured using the VMA bandwidth measurement algorithm, is verified against a target picture VMA bandwidth determined from a target picture VMA bandwidth rate signaled in the compressed bit stream.

As previously mentioned, a maximum picture VMA bandwidth rate is specified by the video coding standard, e.g., HEVC. Further, the video coding standard may specify a maximum picture VMA bandwidth rate for each level of each profile defined by the video coding standard. The value of the maximum picture VMA bandwidth rate specified in the coding standard may be determined according to a normative reference block caching model (virtual memory access model) specified for a decoder in the standard. The normative reference block caching model may specify for example, a cache size, cache line size, cache organization, replacement strategy, memory alignment, and memory burst size to be used for measuring VMA bandwidth. For example, the reference block caching model may be as follows: cache size=128 KB, cache line size=64 bytes, cache organization=4-way set associative, replacement strategy=least recently used, memory alignment=64 bits, memory burst size=128 bits. Further, the caching model may assume that luminance and chrominance samples of a reference picture are stored separately and that chrominance values, i.e., U, V pixel values, for a reference picture are interleaved in memory sample by sample.

The use of profiles and levels in a video coding standard is well known. In general, profiles and levels specify restrictions on bit streams and hence limits on the capabilities needed to decode the bit streams. Profiles and levels may also be used to indicate interoperability points between individual decoder implementations. In HEVC, a profile specifies a subset of algorithmic features and limits that are to be supported by all decoders conforming to that profile and a level within a profile specifies a set of limits on the values that may be taken by syntax elements. Further, the same set of level definitions is used with all profiles, but individual decoder implementations may support a different level for each supported profile. For any given profile, levels generally correspond to decoder processing load and memory capabilities. Examples of profile and level definitions that may be extended to include specification of a maximum picture VMA bandwidth rate may be found, for example, in HEVC Draft 8. While the first released version of HEVC may include a single profile, additional profiles may be added in the future.

The video coding standard also specifies how to measure VMA bandwidth consumed for some block size, e.g., a PU, according to the normative reference block caching model to check for compliance with a target VMA bandwidth rate, i.e., the standard specifies a normative VMA bandwidth measurement algorithm. For example, the VMA bandwidth measurement algorithm may be specify how to compute the consumed VMA bandwidth for an inter-predicted PU (in one prediction direction) according to the normative reference block caching model, i.e., 1) compute the consumed VMA bandwidth for the luma component block of the PU according to the normative reference block caching model; 2) compute the consumed VMA bandwidth for the chroma component block of the PU according to the normative reference block caching model; 3) PU consumed VMA bandwidth=luma consumed VMA bandwidth+chroma consumed VMA bandwidth. To compute the consumed VAM bandwidth for a bi-predicted PU, the algorithm may be performed for the forward direction (list 0) and the backward direction (list1) and the results added.

Table 1 is an example of how the computation of consumed VMA bandwidth (in one prediction direction) for a component block of a PU for a normative reference cache model may be performed. In particular, this example details how consumed VMA bandwidth is measured for a PU component block given the PU component block size, and location, the tap-length of the motion compensation interpolation filter for the component block, the prediction direction (i.e., list0 or list1 prediction), the motion vector, the number of sample bits per pixel, and the normative reference cache model. Note that reference data block of size N×M has M lines, and each line has N samples.

TABLE 1

1) Compute coordinates (iLeftPos, iTopPos), (iRightPos, iBottomPos) of upper-left and bottom right corners of the reference block based on filter-tap length, the PU component block location and size, and the motion vector.
2) Compute start address (in bits) i64StartAddress of the reference block based on bit-depth (bits per pixel) iBitDepth, picture width iPicWidth, and the coordinates (iLeftPos, iTopPos) of the upper-left corner of the reference block: i64StartAddress = iBitDepth * (iPicWidth * iTopPos + iLeftPos).

TABLE 1-continued

3) Compute and sum the number of memory access bytes iMemAccessBytes line by line for the reference block by the following steps:
   a. Set line number lineNum to iTopPos, and iMemAccessBytes to 0.
   b. Compute the start address i64LeftAddress and end address i64RightAddress of the line:
      i64LeftAddress = i64StartAddress
      i64RightAddress = i64StartAddress + iBitDepth*(iRightPos − iLeftPos)
   c. Compute the memory aligned start address i64MemAlignedLeftAddress and end address i64MemAlignedRightAddress of the line based on the memory alignment size iMAS (in bits):
      i64MemAlignedLeftAddress = (i64LeftAddress/iMAS)*iMAS
      if (i64LeftAddress < 0)
      i64MemAlignedLeftAddress −= iMAS*(i64LeftAddress%iMAS)
      i64MemAlignedRightAddress = (i64RightAddress/iMAS)*iMAS
      if (i64RightAddress%MAS)
      i64MemAlignedRightAddress += iMAS
   d. Compute the number of reference data bytes iMemAccessBytesPerLine to be accessed for the line based on the memory burst size iMBS (in bits):
      iMemAccessBytesPerLine to be accessed for the line based on the memory burst size iMBS (in bits), by
      bitsPerLine = i64MemAlignedRightAddress − i64MemAlignedLeftAddress
      iMemAccessBytesPerLine = (bitsPerLine/iMBS)*iMBS/8
      if (bitsPerLine%iMBS)
      iMemAccessBytesPerLine += (iMBS/8)
   e. Check the cache to see if the reference data for the line is already in the cache. For the cache check, the line may be divided into multiple un-overlapped segments. For each segment, if the reference data is not loaded in the cache (cache miss), iMemAccessBytes is increased by one cache line size iCacheLineSize (in bytes): iMemAccessBytes += iCacheLineSize. Also, reference data is loaded for the corresponding cache line. If the reference data is in the cache, the memory bandwidth for the segment is 0 as no off-chip memory access is needed for the segment. In this case, cache states may be updated. For example, the access frequency of cache lines may be updated if the cache replacement strategy is" least recently used" (LRU).
   f. Update the start address i64StartAddress: i64StartAddress += iBitDepth * iPicWidth; and, update the line line number: lineNum++
   g. If the line number lineNum is less than iBottomPos, go to b); otherwise, end processing and output the VMA bandwidth measure iMemAccessBytes.

Figure 5:
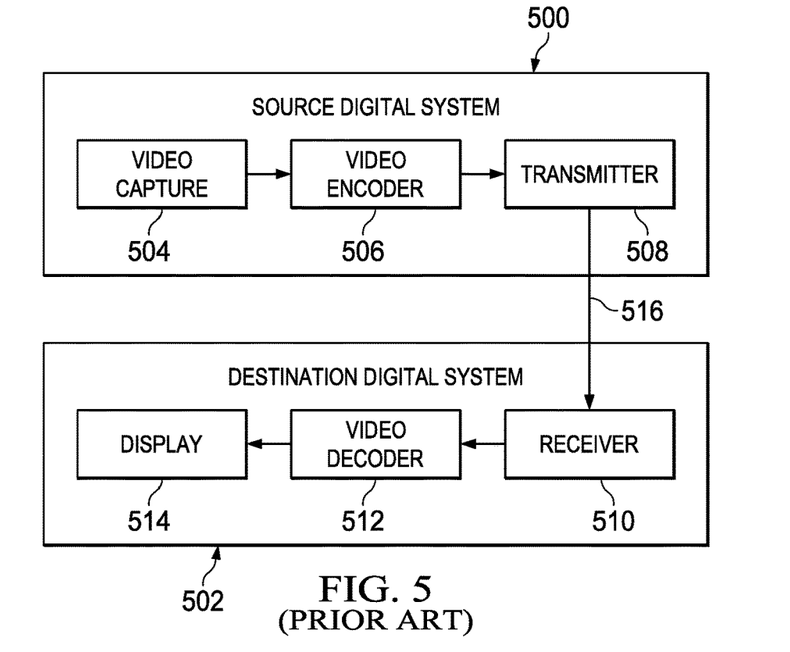
FIG. 5 is a block diagram of a digital system.

FIG. 5 shows a block diagram of a digital system that includes a source digital system 500 that transmits encoded video sequences to a destination digital system 502 via a communication channel 516. The source digital system 500 includes a video capture component 504, a video encoder component 506, and a transmitter component 508. The video capture component 504 is configured to provide a video sequence to be encoded by the video encoder component 506. The video capture component 504 may be, for example, a video camera, a video archive, or a video feed from a video content provider. In some embodiments, the video capture component 504 may generate computer graphics as the video sequence, or a combination of live video, archived video, and/or computer-generated video.

The video encoder component 506 receives a video sequence from the video capture component 504 and encodes it for transmission by the transmitter component 508. The video encoder component 506 receives the video sequence from the video capture component 504 as a sequence of pictures, divides the pictures into largest coding units (LCUs), and encodes the video data in the LCUs. The video encoder component 506 may be configured to verify VMA bandwidth rate conformance, i.e., to impose a VMA bandwidth rate on the compressed bit stream, during the encoding process as described herein. An embodiment of the video encoder component 506 is described in more detail herein in reference to FIG. 6.

The transmitter component 508 transmits the encoded video data to the destination digital system 502 via the communication channel 516. The communication channel 516 may be any communication medium, or combination of communication media suitable for transmission of the encoded video sequence, such as, for example, wired or wireless communication media, a local area network, or a wide area network.

The destination digital system 502 includes a receiver component 510, a video decoder component 512 and a display component 514. The receiver component 510 receives the encoded video data from the source digital system 500 via the communication channel 516 and provides the encoded video data to the video decoder component 512 for decoding. The video decoder component 512 reverses the encoding process performed by the video encoder component 506 to reconstruct the LCUs of the video sequence. The video decoder component 512 may be configured to verify VMA bandwidth rate conformance of the compressed bit stream being decoded as described herein during the decoding process. An embodiment of the video decoder component 512 is described in more detail below in reference to FIG. 7.

The reconstructed video sequence is displayed on the display component 514. The display component 514 may be any suitable display device such as, for example, a plasma display, a liquid crystal display (LCD), a light emitting diode (LED) display, etc.

In some embodiments, the source digital system 500 may also include a receiver component and a video decoder component and/or the destination digital system 502 may include a transmitter component and a video encoder component for transmission of video sequences both directions for video steaming, video broadcasting, and video telephony. Further, the video encoder component 506 and the video decoder component 512 may perform encoding and decoding in accordance with one or more video compression standards. The video encoder component 506 and the video decoder component 512 may be implemented in any suitable combination of software, firmware, and hardware, such as, for example, one or more digital signal processors (DSPs), microprocessors, discrete logic, application specific integrated circuits (ASICs), field-programmable gate arrays (FPGAs), etc.

Figure 6:
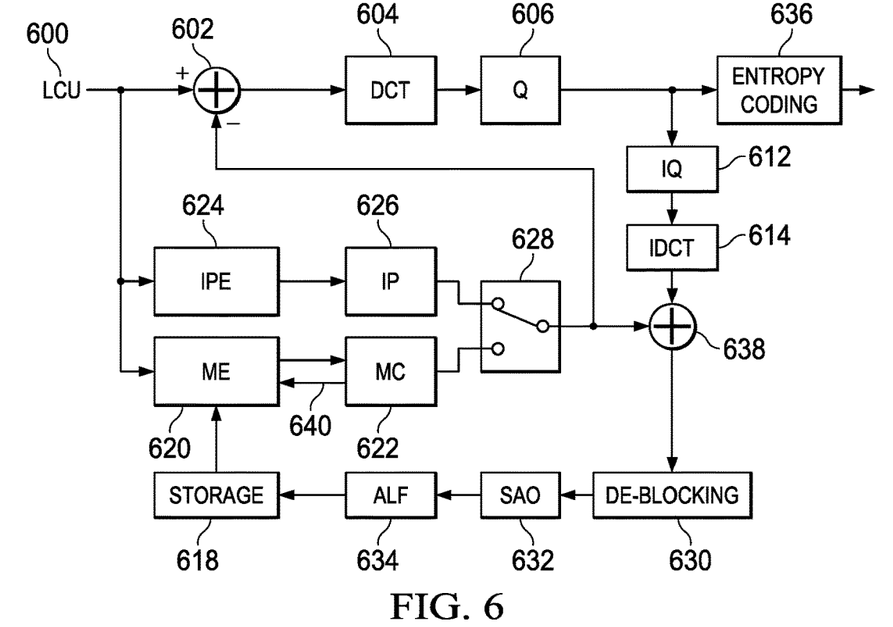
FIG. 6 is a block diagram of a video encoder.

FIG. 6 shows a block diagram of the LCU processing portion of an example video encoder, e.g., the video encoder 506 of FIG. 5. A coding control component (not shown) sequences the various operations of the LCU processing, i.e., the coding control component runs the main control loop for video encoding. The coding control component receives a digital video sequence and performs any processing on the input video sequence that is to be done at the picture level, such as determining the coding type (I, P, or B) of a picture based on the high level coding structure, e.g., IPPP, IBBP, hierarchical-B, and dividing a picture into LCUs for further processing.

In addition, for pipelined architectures in which multiple LCUs may be processed concurrently in different components of the LCU processing, the coding control component controls the processing of the LCUs by various components of the LCU processing in a pipeline fashion. For example, in many embedded systems supporting video processing, there may be one master processor and one or more slave processing modules, e.g., hardware accelerators. The master processor operates as the coding control component and runs the main control loop for video encoding, and the slave processing modules are employed to off load certain compute-intensive tasks of video encoding such as motion estimation, motion compensation, intra prediction mode estimation, transformation and quantization, entropy coding, and loop filtering. The slave processing modules are controlled in a pipeline fashion by the master processor such that the slave processing modules operate on different LCUs of a picture at any given time. That is, the slave processing modules are executed in parallel, each processing its respective LCU while data movement from one processor to another is serial.

The LCU processing receives LCUs 600 of the input video sequence from the coding control component and encodes the LCUs 600 under the control of the coding control component to generate the compressed video stream. The LCUs 600 in each picture are processed in row order. The LCUs 600 from the coding control component are provided as one input of a motion estimation component (ME) 620, as one input of an intra-prediction estimation component (IPE) 624, and to a positive input of a combiner 602 (e.g., adder or subtractor or the like). Further, although not specifically shown, the prediction mode of each picture as selected by the coding control component is provided to a mode decision component 628 and the entropy coding component 636.

The storage component 618 provides reference data to the motion estimation component 620 and to the motion compensation component 622. The reference data stored by the storage component 618 may include one or more previously encoded and decoded pictures, i.e., reference pictures. The storage component 618 includes a combination of on-chip memory and off-chip memory. Further, the storage component 618 includes functionality to move reference data between the off-chip memory and the on-chip memory as needed by the motion estimation component 620 and the motion compensation component 622. In some embodiments, to reduce memory bandwidth, the reference data is stored in a format in which the luminance plane is stored separately followed by chrominance planes interleaved sample by sample.

The motion estimation component 620 provides motion data information to the motion compensation component 622 and the entropy coding component 636. More specifically, the motion estimation component 620 performs tests on CUs in an LCU based on multiple inter-prediction modes (e.g., skip mode, merge mode, and normal or direct inter-prediction), PU sizes, and TU sizes using reference picture data from storage 618 to choose the best CU partitioning, PU/TU partitioning, inter-prediction modes, motion vectors, etc. based on, e.g., a rate distortion coding cost. To perform the tests, the motion estimation component 620 may divide an LCU into CUs according to the maximum hierarchical depth of the quadtree, and divide each CU into PUs according to the unit sizes of the inter-prediction modes and into TUs according to the transform unit sizes, and calculate the coding costs for each PU size, prediction mode, and transform unit size for each CU. The motion estimation component 620 provides the motion vector (MV) or vectors and the prediction mode for each PU in the selected CU partitioning to the motion compensation component (MC) 622.

The motion compensation component (MC) 622 receives information from the motion estimation component 620 and generates the inter-predicted CUs using an interpolation filter, e.g., an 8-tap interpolation filter for luminance motion compensation or a 4-tap filter for chrominance motion compensation. The inter-predicted CUs are provided to the mode decision component 628 along with the selected inter-prediction modes for the inter-predicted PUs and corresponding TU sizes for the selected CU/PU/TU partitioning. The coding costs of the inter-predicted CUs are also provided to the mode decision component 628.

The intra-prediction estimation component 624 (IPE) performs intra-prediction estimation in which tests on CUs in an LCU based on multiple intra-prediction modes, PU sizes, and TU sizes are performed using reconstructed data from previously encoded neighboring CUs stored in a buffer (not shown) to choose the best CU partitioning, PU/TU partitioning, and intra-prediction modes based on a rate distortion coding cost. To perform the tests, the intra-prediction estimation component 624 may divide an LCU into CUs according to the maximum hierarchical depth of the quadtree, and divide each CU into PUs according to the unit sizes of the intra-prediction modes and into TUs according to the transform unit sizes, and calculate the coding costs for each PU size, prediction mode, and transform unit size for each PU. The intra-prediction estimation component 624 provides the selected intra-prediction modes for the PUs, and the corresponding TU sizes for the selected CU partitioning to the intra-prediction component (IP) 626. The coding costs of the intra-predicted CUs are also provided to the intra-prediction component 626.

The intra-prediction component 626 (IP) receives intra-prediction information from the intra-prediction estimation component 624 and generates the intra-predicted CUs. The intra-predicted CUs are provided to the mode decision component 628 along with the selected intra-prediction modes for the intra-predicted PUs and corresponding TU sizes for the selected CU/PU/TU partitioning.

The mode decision component 628 selects between intra-prediction of a CU and inter-prediction of a CU based on the intra-prediction coding cost of the CU from the intra-prediction component 626, the inter-prediction coding cost of the CU from the motion compensation component 622, and the picture prediction mode provided by the coding control component. Based on the decision as to whether a CU is to be intra- or inter-coded, the intra-predicted PUs or inter-predicted PUs are selected. The selected CU/PU/TU partitioning with corresponding modes, motion vector(s), reference picture index (indices), and prediction direction(s) (if any) are provided to the entropy coding component 636.

The output of the mode decision component 628, i.e., the predicted PUs, is provided to a negative input of the combiner 602 and to the combiner 638. The associated transform unit size is also provided to the transform component 604. The combiner 602 subtracts a predicted PU from the original PU to provide residual PUs to the transform component 604. Each resulting residual PU is a set of pixel difference values that quantify differences between pixel values of the original PU and the predicted PU. The residual blocks of all the PUs of a CU form a residual CU block for further processing.

The transform component 604 performs block transforms on all residual CUs to convert the residual pixel values to transform coefficients and provides the transform coefficients to a quantize component 606. More specifically, the transform component 604 receives the transform unit sizes for the residual CU and applies transforms of the specified sizes to the CU to generate transform coefficients. Further, the quantize component 606 quantizes the transform coefficients based on quantization parameters (QPs) and quantization matrices provided by the coding control component and the transform sizes and provides the quantized transform coefficients to the entropy coding component 636 for coding in the bit stream.

The entropy coding component 636 entropy encodes the relevant data, i.e., syntax elements, output by the various encoding components to generate the compressed video bit stream. As is well known, syntax elements are defined by a coding standard and are encoded according to a syntactical order specified in the coding standard. This syntactical order specifies the order in which syntax elements should occur in a compressed video bit stream. Among the syntax elements that are encoded are flags indicating the CU/PU/TU partitioning of an LCU, the prediction modes for the CUs, and the quantized transform coefficients for the CUs. The entropy coding component 636 also codes relevant data such as ALF parameters, e.g., filter type, on/off flags, and filter coefficients, and SAO parameters, e.g., filter type, on/off flags, and offsets.

The LCU processing includes an embedded decoder. As any compliant decoder is expected to reconstruct an image from a compressed bit stream, the embedded decoder provides the same utility to the video encoder. Knowledge of the reconstructed input allows the video encoder to transmit the appropriate residual energy to compose subsequent pictures.

The quantized transform coefficients for each CU are provided to an inverse quantize component (IQ) 612, which outputs a reconstructed version of the transform result from the transform component 604. The dequantized transform coefficients are provided to the inverse transform component (IDCT) 614, which outputs estimated residual information representing a reconstructed version of a residual CU. The inverse transform component 614 receives the transform unit size used to generate the transform coefficients and applies inverse transform(s) of the specified size to the transform coefficients to reconstruct the residual values. The reconstructed residual CU is provided to the combiner 638.

The combiner 638 adds the original predicted CU to the residual CU to generate a reconstructed CU, which becomes part of reconstructed picture data. The reconstructed picture data is stored in a buffer (not shown) for use by the intra-prediction estimation component 624.

Various in-loop filters may be applied to the reconstructed picture data to improve the quality of the reference picture data used for encoding/decoding of subsequent pictures. The in-loop filters may include a deblocking filter 630, a sample adaptive offset filter (SAO) 632, and an adaptive loop filter (ALF) 634. In some embodiments, the ALF 634 may not be present. In general, the deblocking filter 630 operates to smooth discontinuities at block boundaries, i.e., TU and CU block boundaries, in a reconstructed picture. In general, the SAO filter 632 determines the best offset values, i.e., band offset values or edge offset values, to be added to pixels of a reconstructed picture to compensate for intensity shift that may have occurred during the block based coding of the picture and applies the offset values to the reconstructed picture. In general, the ALF 634 implements an adaptive Wiener filtering technique to minimize distortion in the reconstructed picture as compared to the original picture.

The various in-loop filters may be applied on an LCU-by-LCU basis. Further, the three in-loop filters may be applied sequentially as shown in FIG. 6 to each reconstructed LCU. That is, the deblocking filter 630 may be first applied to the reconstructed data. Then, the SAO 632 may be applied to the deblocked reconstructed picture data, and the ALF 634 may be applied to the SAO filtered reconstructed picture data. The final filtered reference picture data is provided to the storage component 618.

During the LCU encoding performed by the video encoder of FIG. 6, VMA bandwidth verification is performed to impose a target picture VMA bandwidth rate on the generated compressed bit stream. To impose the target picture VMA bandwidth rate on the generated compressed bit stream, the motion compensation component 622 may compute the VMA bandwidth consumed for each LCU and provide feedback 640 based on the consumed VMA bandwidth to the motion estimation component 622 if adjustments need to be made in motion estimation for one or more subsequent LCUs to avoid exceeding a target VMA bandwidth rate. Methods for imposing a target VMA bandwidth rate on a compressed bit stream that may be used are described below in reference to FIGS. 8-11.

Figure 7:
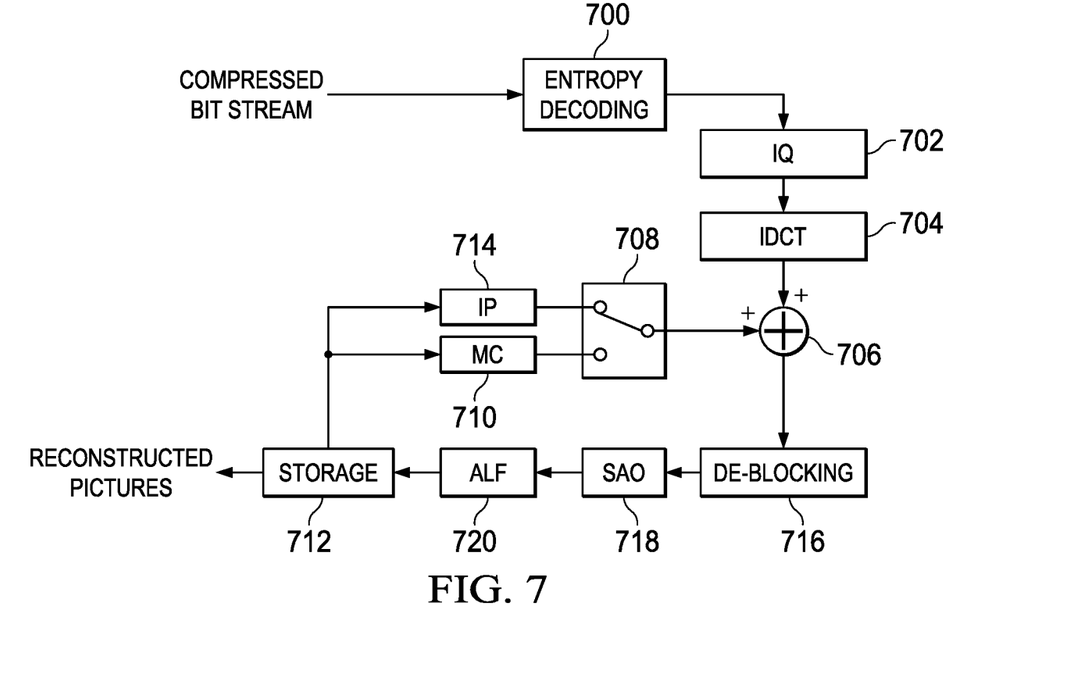
FIG. 7 is a block diagram of a video decoder.

FIG. 7 is a block diagram of an example video decoder, e.g., the video decoder 512 of FIG. 5. The video decoder operates to reverse the encoding operations, i.e., entropy coding, quantization, transformation, and prediction, performed by the video encoder of FIG. 6 to regenerate the pictures of the compressed video sequence. In view of the above description of a video encoder, one of ordinary skill in the art will understand the functionality of components of the video decoder without need for detailed explanation.

The entropy decoding component 700 receives an entropy encoded (compressed) video bit stream and reverses the entropy coding to recover the encoded syntax elements, e.g., CU, PU, and TU structures of LCUs, quantized transform coefficients for CUs, motion vectors, prediction modes, etc. The decoded syntax elements are passed to the various components of the decoder as needed. For example, decoded prediction modes are provided to the intra-prediction component (IP) 714 or motion compensation component (MC) 710. If the decoded prediction mode is an inter-prediction mode, the entropy decoder 700 reconstructs the motion vector(s) as needed and provides the motion vector(s) to the motion compensation component 710.

The inverse quantize component (IQ) 702 de-quantizes the quantized transform coefficients of the CUs. The inverse transform component 704 transforms the frequency domain data from the inverse quantize component 702 back to the residual CUs. That is, the inverse transform component 704 applies an inverse unit transform, i.e., the inverse of the unit transform used for encoding, to the de-quantized residual coefficients to produce reconstructed residual values of the CUs.

A residual CU supplies one input of the addition component 706. The other input of the addition component 706 comes from the mode switch 708. When an inter-prediction mode is signaled in the encoded video stream, the mode switch 708 selects predicted PUs from the motion compensation component 710 and when an intra-prediction mode is signaled, the mode switch selects predicted PUs from the intra-prediction component 714.

The motion compensation component 710 receives reference data from the storage component 712 and applies motion compensation to the reference data to generate a predicted PU. That is, the motion compensation component 710 uses the motion vector(s) from the entropy decoder 700 and the reference data to generate a predicted PU.

The intra-prediction component 714 receives reconstructed samples from previously reconstructed PUs of a current picture from the storage component 712 and performs the intra-prediction computed by the encoder as signaled by an intra-prediction mode transmitted in the encoded video bit stream using the reconstructed samples as needed to generate a predicted PU.

The addition component 706 generates a reconstructed CU by adding the predicted PUs selected by the mode switch 708 and the residual CU. The output of the addition component 706, i.e., the reconstructed CUs, is stored in the storage component 712 for use by the intra-prediction component 714.

The storage component 712 provides reference data to the motion compensation component 710. The reference data stored by the storage component 712 may include one or more previously decoded pictures, i.e., reference pictures. The storage component 712 includes a combination of on-chip memory and off-chip memory. Further, the storage component 712 includes functionality to move reference data between the off-chip memory and the on-chip memory as needed by the motion compensation component 710. In some embodiments, to reduce memory bandwidth, the reference data is stored in a format in which the luminance plane is stored separately followed by chrominance planes interleaved sample by sample.

In-loop filters may be applied to the reconstructed picture data to improve the quality of the decoded pictures and the quality of the reference picture data used for decoding of subsequent pictures. The in-loop filters are the same as those of the encoder, i.e., a deblocking filter 716, a sample adaptive offset filter (SAO) 718, and an adaptive loop filter (ALF) 720. In some embodiments, the ALF 720 may not be present. The in-loop filters may be applied on an LCU-by-LCU basis. The three in-loop filters may be applied sequentially as shown in FIG. 7 to each reconstructed LCU. That is, the deblocking filter 716 may be first applied to the reconstructed data. Then, the SAO 718 may be applied to the deblocked reconstructed picture data, and the ALF 720 may be applied to the SAO filtered reconstructed picture data. The final filtered LCUs are stored in the storage component 712 and are output as part of the final decoded video sequence.

During the LCU decoding performed by the video decoder of FIG. 7, VMA bandwidth verification is performed to verify that the compressed bit stream conforms to a target picture VMA bandwidth rate. Methods for verifying VMA bandwidth that may be used are described below in reference to FIGS. 8 and 12.

Figure 8:
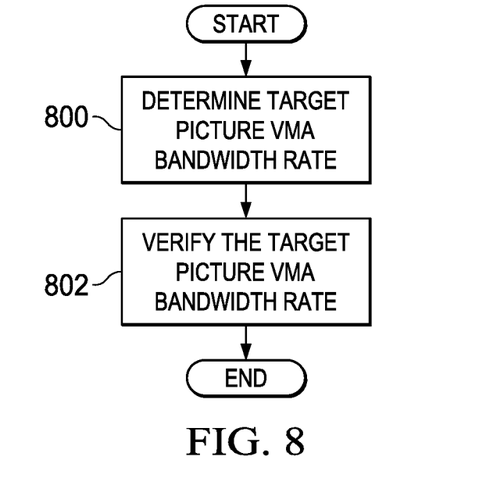
FIGS. 8-10 are flow diagrams of methods.

FIG. 8 is a flow diagram of a method for VMA bandwidth verification that may be performed in an encoder, e.g., the encoder of FIG. 6, or a decoder, e.g., the decoder of FIG. 7. Initially, a target picture VMA bandwidth rate is determined 800. In an encoder, the target picture VMA bandwidth is determined according to a selected profile and level. That is, the encoder selects a profile and level within that profile for a video sequence to be encoded. As previously discussed, a maximum picture VMA bandwidth rate to be imposed on a compressed bit stream is defined for each level in a profile. In some embodiments, the target picture VMA bandwidth rate is set to the maximum picture VMA bandwidth rate of the selected level.

In some embodiments, the encoder may set the target picture VMA bandwidth rate to be less than the maximum picture VMA bandwidth rate. The maximum picture VMA bandwidth rate specified in a coding standard for a profile/level may be set according to the specified reference block caching model and the specified VMA bandwidth measurement algorithm. Reference block caching models and VMA bandwidth measurement algorithms are previously discussed in more detail herein. In some applications, the video sequences being encoded may have small movement from scene to scene and thus have a smaller VMA bandwidth rate than the maximum bandwidth rate, which is typically determined according to a variety of representative video sequences. The encoder may use any suitable technique to determine a target picture VMA bandwidth rate that is less than the maximum picture VMA bandwidth rate. For example, the encoder may track the VMA bandwidth rate actually met in a previously encoded video sequence, which may be less than the maximum VMA bandwidth rate, and use this "actual" VMA bandwidth rate as the target VMA bandwidth rate for the next video sequence. In such embodiments, the encoder signals the target picture VMA bandwidth rate in the encoded bit stream if it is less than the maximum picture VMA bandwidth specified for the particular level.

In some embodiments, in a decoder, the target picture VMA bandwidth rate is determined according to a profile and level signaled in the compressed bit stream. More specifically, the target picture VMA bandwidth rate is set to the maximum picture VMA bandwidth rate defined in the video coding standard for the profile/level signaled in the compressed bit stream. In some embodiments, in a decoder, the target picture VMA bandwidth rate may be decoded from the compressed bit stream, i.e., the target bandwidth rate is signaled in the bit stream.

Once the target picture VMA bandwidth rate is determined, the bandwidth rate is verified 802 for a compressed bit stream. In an encoder, the target picture VMA bandwidth rate is verified for the generated compressed bit stream by imposing the target picture VMA bandwidth rate on the generated compressed bit stream, i.e., by controlling VMA bandwidth used during encoding of a picture on an LCU by LCU basis to ensure that a consumed VMA bandwidth for the picture does not exceed a target picture VMA bandwidth determined from the target picture VMA bandwidth rate. Any suitable technique for controlling the consumed VMA bandwidth may be used. For example, the method of FIG. 9 or the method of FIG. 10 may be used. In a decoder, conformance to the target picture VMA bandwidth rate is verified as the compressed bit stream is decoded. An example verification method that may be used is described in reference to FIG. 12.

Figure 9:
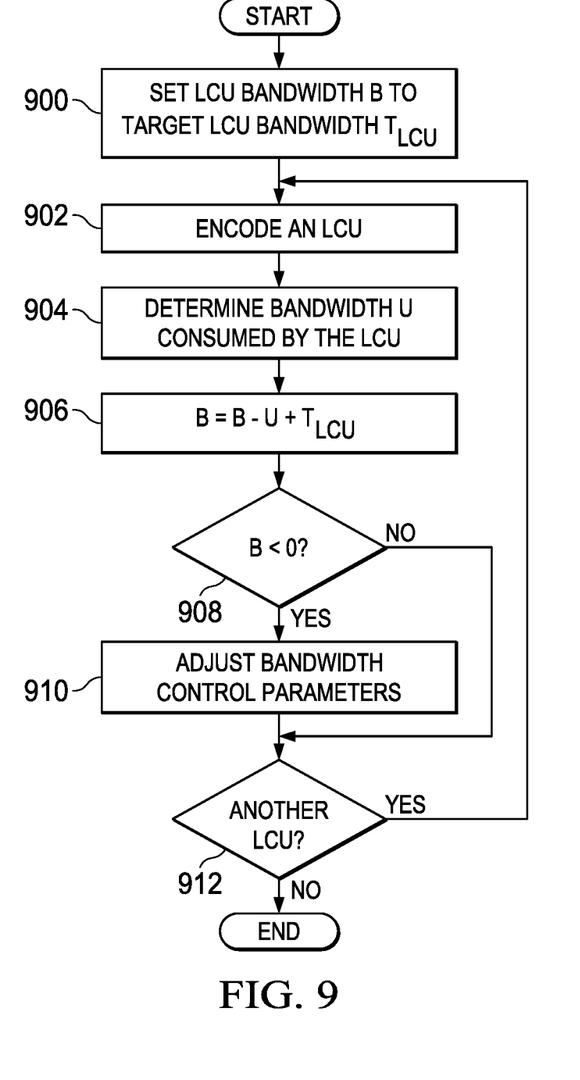

FIG. 9 is a flow diagram of a method for controlling a target picture VMA bandwidth rate in an encoder. In general, in this method, the target picture VMA bandwidth rate is enforced by adjusting bandwidth control parameters for motion estimation from LCU to LCU in a picture as needed to ensure that a target picture VMA bandwidth is not exceeded. Before encoding a picture, the target LCU VMA bandwidth, B, for an LCU in the picture is set 900 to an LCU VMA bandwidth $T_{LCU}$ determined from the target picture VMA bandwidth rate. The LCU VMA bandwidth $T_{LCU}$ may be computed, for example, as $(R*\Delta t_n)/N$ where R is the target picture VMA bandwidth rate and N is the number of LCUs in the picture. For a fixed frame rate video sequence, $\Delta t_n = 1/$frame rate. For a variable frame rate video sequence, $\Delta t_n = t(n) - t(n-1)$ where $t(n)$ is the display time of the current picture and $t(n-1)$ is the display time of the previous picture (in display order). Note that for a variable frame rate video sequence, the value of $T_{LCU}$ is computed for each picture as $\Delta t_n$ may be different from picture to picture.

An LCU of the picture is then encoded 902 and the VMA bandwidth, U, consumed by motion compensation is determined 906. The consumed VMA bandwidth is determined according to the VMA bandwidth measurement algorithm defined by the video coding standard. For example, the previously described VMA bandwidth measurement algorithm may be used to compute the consumed VMA bandwidth for each inter-predicted PU in the LCU. Note that some CUs/PUS may be intra-predicted and are not included in the bandwidth computation. The LCU consumed VMA bandwidth is then the sum of the bandwidths computed for the inter-predicted PUs.

The target LCU VMA bandwidth, B, is then adapted 906 for the next LCU in the picture, i.e., B=B−U+$T_{LCU}$. If the target LCU VMA bandwidth for the next LCU is negative 908, then the VMA bandwidth control parameters are adjusted 910 to decrease the VMA bandwidth consumed for the next LCU, and the next LCU, if any 912, is encoded using the adjusted parameters. Otherwise, the next LCU, if any 912, is encoded with the current parameters. The VMA bandwidth control parameters constrain motion estimation to reduce VMA bandwidth. To minimize encoding efficiency degradation, the number of reference pictures used by motion estimation and the SCU size for CU partitioning may be changed based on the absolute value of B, |B|. For example, if B<0 and T<|B|≤3*T, then the maximum number of reference pictures for motion estimation is limited to two and 8×8 CUs are disabled. If B<0 and |B|>3*T, the maximum number of reference pictures for motion estimation is limited to one and 8×8 CUs are disabled.

Figure 10:
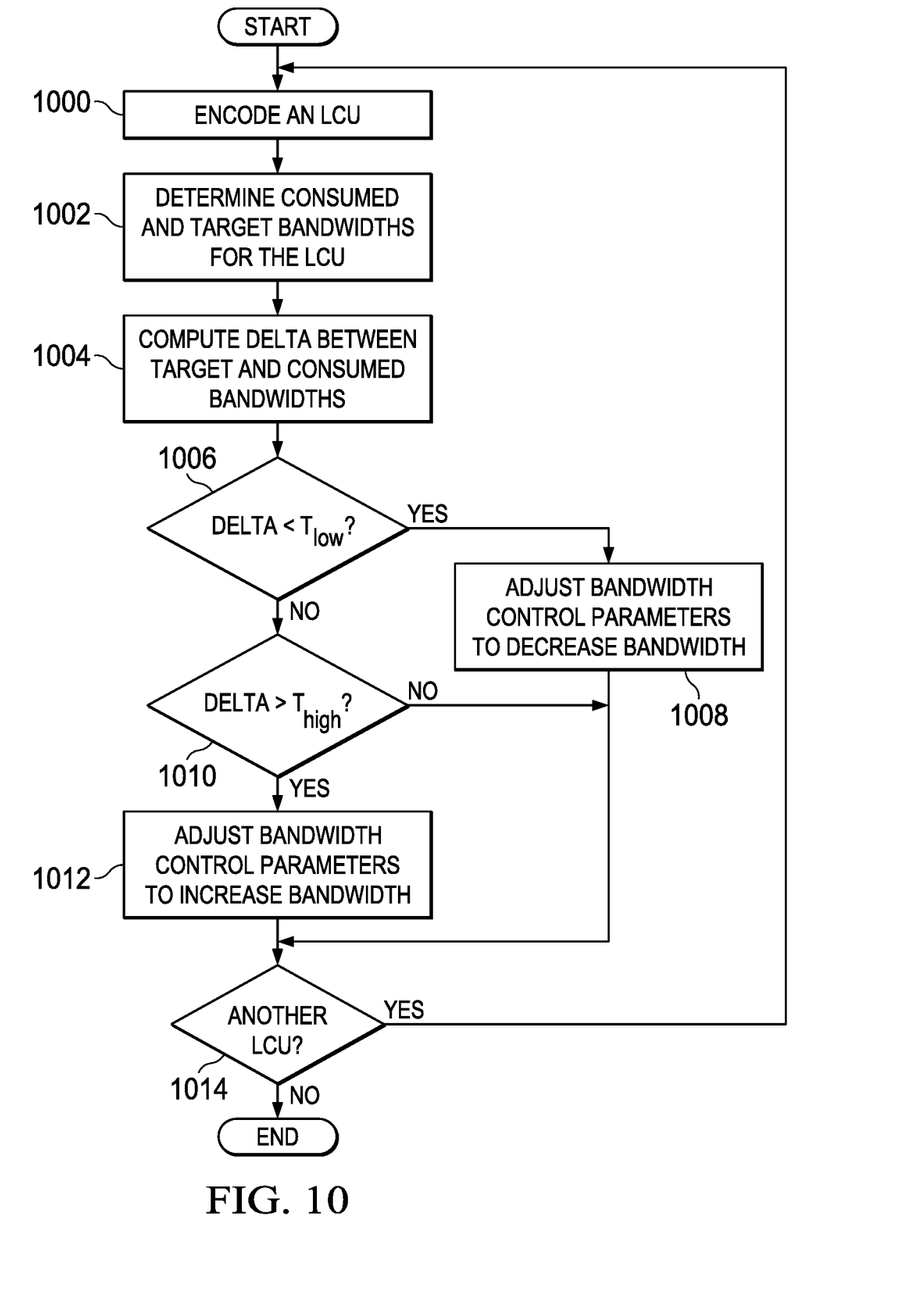
Figure 11:
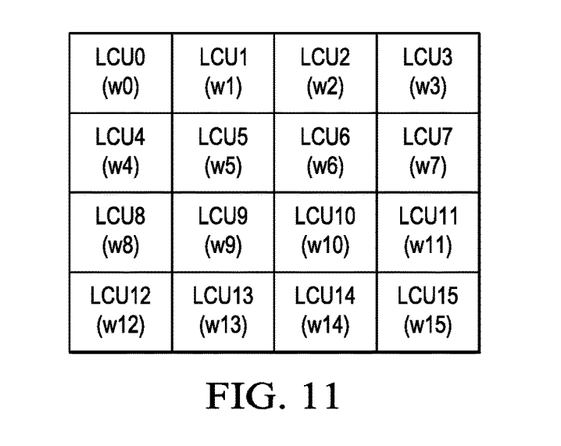
FIG. 11 is an example.

FIG. 10 is a flow diagram of a method for controlling a target picture VMA bandwidth rate in an encoder. Further, as illustrated in the example of FIG. 11, each LCU of a picture is assigned a weighting factor that is used to determine the consumed VMA bandwidth for each LCU. These weighting factors indicate the relative distribution of VMA bandwidth consumption among the LCUs and may be determined by any suitable technique. For example, equal distribution of VMA bandwidth consumption among the LCUs may be assumed, in which case all of the LCU weighting factors are 1. In another example, the assumption may be that an LCU in the current picture will consume approximately the same VMA bandwidth as the co-located LCU in a reference picture. Given the VMA bandwidth consumed by the co-located LCUs in the reference picture, weighting factors for LCUs in the current picture can be estimated. In another example, the weighting factors may be based on the pre-motion estimation results of the picture at low-resolution, i.e., motion estimation on the decimated picture. The estimation results may be used to coarsely estimate VMA bandwidth consumption distribution among LCUs in the picture at the original resolution.

Initially, an LCU in the picture is encoded 1000. The VMA bandwidth consumed by the LCU and the target VMA memory bandwidth for the LCU are then determined 1002 as per $$\begin{cases} delta_{-1} = 0 \\ delta_k = delta_{k-1} + T^k - d^k \\ T^k = \dfrac{w^k}{\sum_{j=0}^{N-1} w^j} T \quad k = 0, 1, 2, \ldots, N-1 \end{cases}$$

where $d^k$ is the VMA bandwidth consumed for $LCU^k$ as determined according to a VMA bandwidth measurement algorithm defined by the video coding standard, $T^k$ is the target LCU VMA bandwidth, $w^k$ is the weight assigned to the LCU, and T=R*$\Delta t_n$, where T is the target VMA bandwidth for a picture and R is the target VMA bandwidth rate for a picture. The variable $\Delta t_n$ is previously described herein.

Note that for a variable frame rate video sequence, the value of T is computed for each picture as $\Delta t_n$ may be different from picture to picture.

The difference, $delta_k$, between the target VMA bandwidth and the consumed VMA bandwidth is then determined 1004. If $delta_k$ is less than 1006 a low threshold, $T_{low}$, one or more of the VMA bandwidth parameters are adjusted 108 to decrease consumed VMA bandwidth for the next LCU. The VMA parameters that may be adjusted to constrain motion estimation include, for example, the number of reference pictures, the CU hierarchy depth, enable/disable bi-directional prediction, and/or motion vector search range. The particular adjustments made may be decided in any suitable way. For example, the encoder may choose to first reduce the number of reference pictures. If the number of reference pictures reaches a minimum, the CU hierarchy depth may be reduced incrementally. If the hierarchy depth reaches 0 (no split), bi-prediction may be disabled. Finally, the search range may be reduced.

If $delta_k$ is greater than 1010 a high threshold, $T_{high}$, one or more of the VMA bandwidth parameters is adjusted to increase consumed VMA bandwidth for the next LCU. The particular adjustments made may be decided in any suitable way. For example, the encoder may do the reverse of the above described approach to decreasing consumed VMA bandwidth. The values of $T_{low}$ and $T_{high}$ may be determined, for example, by characteristics of incoming picture content or by other techniques. For example, $T_{low}$ and $T_{high}$ can be fixed to 0 and T/N, respectively. The next LCU, if any 1014, is then processed.

Figure 12:
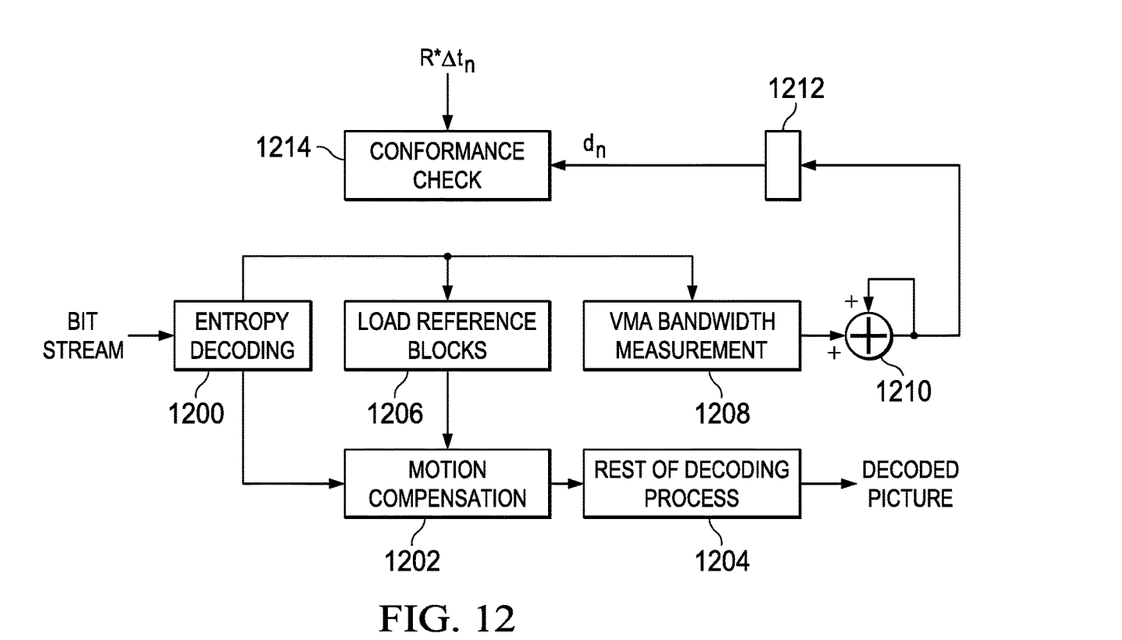
FIG. 12 is a block diagram illustrating virtual memory bandwidth verification in a video decoder.

FIG. 12 is block diagram illustrating a method for VMA bandwidth rate verification in a decoder, e.g., the decoder of FIG. 7. As shown in FIG. 12, the motion vector field and DCT coefficients for a picture are decoded from the compressed bit stream by the entropy decoding 1200. Then, the reference blocks for PUs of the picture LCUs are loaded 1206, motion compensation 1202 is performed, and the rest of decoding process 1204 is carried out to reconstruct the picture. Also, the consumed VMA bandwidth is measured 1208 by a VMA bandwidth measurement algorithm LCU by LCU 1210, and accumulated 1212 to determine the consumed VMA bandwidth for the picture.

More specifically, the VMA bandwidth measurement algorithm may measure the consumed VMA bandwidth for an inter-predicted PU. An example of such an algorithm is previously described herein. The VMA bandwidth measurement 1208 may determine the consumed VMA bandwidth for each inter-predicted PU of an LCU, and the consumed VMA bandwidth computed for these PUs summed 1210 to determine the LCU consumed VMA bandwidth for accumulation 1212. After the picture is decoded, a VMA bandwidth rate conformance check 1214 is performed. For this conformance check, the accumulated picture VMA bandwidth $d_n$ is compared with a memory target picture VMA bandwidth R*$\Delta t_n$ to verify bit stream conformance to a target picture VMA bandwidth rate R. If the bit stream does not conform, the decoder may choose to take some action to enforce the target picture bandwidth rate, e.g., skipping frames, or may terminate decoding.

Figure 13:
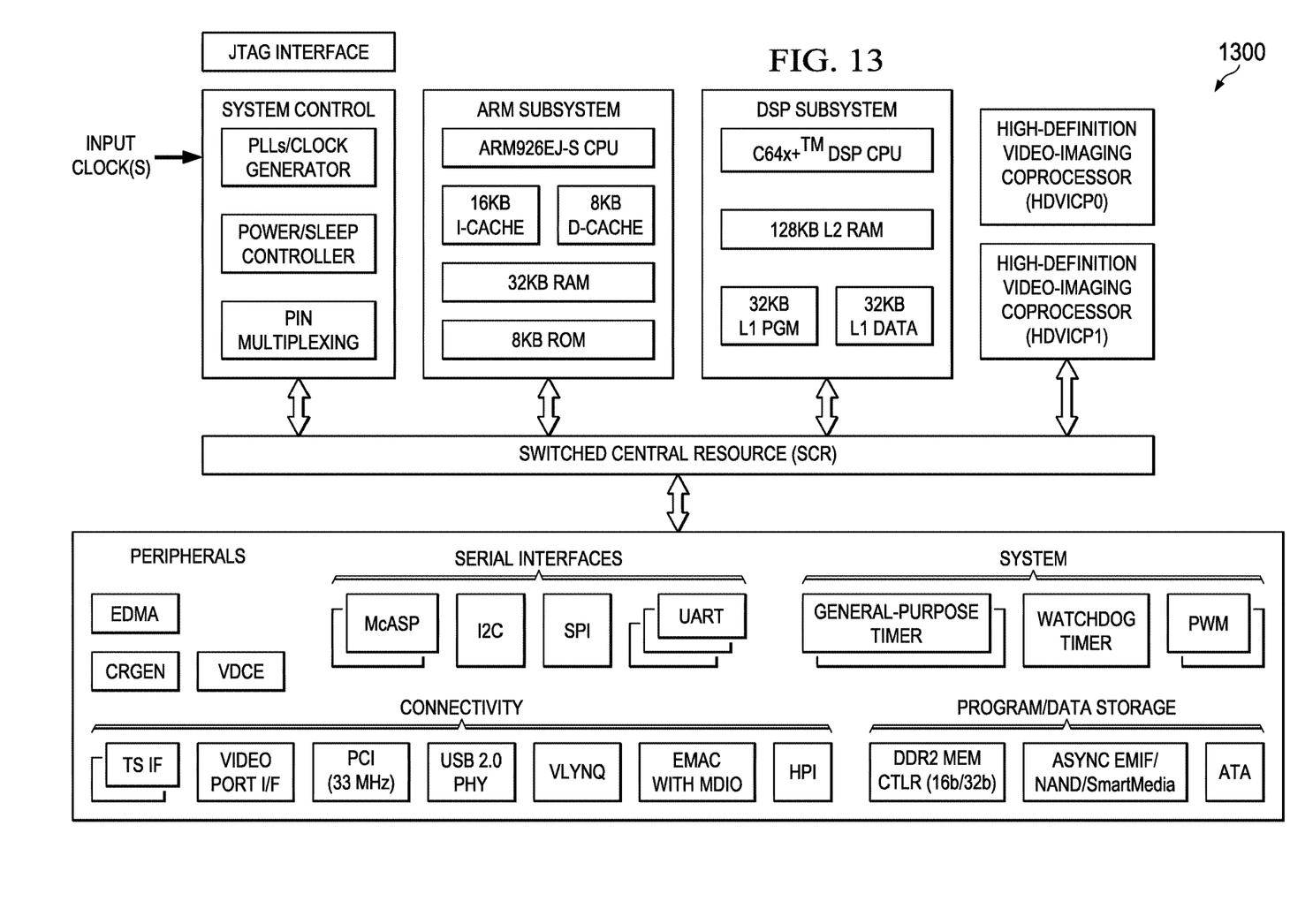
FIG. 13 is a block diagram of an illustrative digital system.

FIG. 13 is a block diagram of an example digital system suitable for use as an embedded system to implement a video encoder and/or a video decoder. The video encoder may be configured to verify VMA bandwidth rate conformance, i.e., to impose a VMA bandwidth rate on the compressed bit stream during the encoding process as described herein. The video decoder may be configured to verify VMA bandwidth rate conformance of a compressed bit stream being decoded as described herein during the decoding process. This example system-on-a-chip (SoC) is representative of one of a family of DaVinci™ Digital Media Processors, available from Texas Instruments, Inc. This SoC is described in more detail in "TMS320DM6467 Digital Media System-on-Chip", SPRS403G, December 2007 or later, which is incorporated by reference herein.

The SoC 1300 is a programmable platform designed to meet the processing needs of applications such as video encode/decode/transcode/transrate, video surveillance, video conferencing, set-top box, medical imaging, media server, gaming, digital signage, etc. The SoC 1300 provides support for multiple operating systems, multiple user interfaces, and high processing performance through the flexibility of a fully integrated mixed processor solution. The device combines multiple processing cores with shared memory for programmable video and audio processing with a highly-integrated peripheral set on common integrated substrate.

The dual-core architecture of the SoC 1300 provides benefits of both DSP and Reduced Instruction Set Computer (RISC) technologies, incorporating a DSP core and an ARM926EJ-S core. The ARM926EJ-S is a 32-bit RISC processor core that performs 32-bit or 16-bit instructions and processes 32-bit, 16-bit, or 8-bit data. The DSP core is a TMS320C64x+TM core with a very-long-instruction-word (VLIW) architecture. In general, the ARM is responsible for configuration and control of the SoC 1300, including the DSP subsystem, the video data conversion engine (VDCE), and a majority of the peripherals and external memories. The switched central resource (SCR) is an interconnect system that provides low-latency connectivity between master peripherals and slave peripherals. The SCR is the decoding, routing, and arbitration logic that enables the connection between multiple masters and slaves that are connected to it.

The SoC 1300 also includes application-specific hardware logic, on-chip memory, and additional on-chip peripherals. The peripheral set includes: a configurable video port (Video Port I/F), an Ethernet MAC (EMAC) with a Management Data Input/Output (MDIO) module, a 4-bit transfer/4-bit receive VLYNQ interface, an inter-integrated circuit (I2C) bus interface, multichannel audio serial ports (McASP), general-purpose timers, a watchdog timer, a configurable host port interface (HPI); general-purpose input/output (GPIO) with programmable interrupt/event generation modes, multiplexed with other peripherals, UART interfaces with modem interface signals, pulse width modulators (PWM), an ATA interface, a peripheral component interface (PCI), and external memory interfaces (EMIFA, DDR2). The video port I/F is a receiver and transmitter of video data with two input channels and two output channels that may be configured for standard definition television (SDTV) video data, high definition television (HDTV) video data, and raw video data capture.

As shown in FIG. 13, the SoC 1300 includes two high-definition video/imaging coprocessors (HDVICP) and a video data conversion engine (VDCE) to offload many video and image processing tasks from the DSP core. The VDCE supports video frame resizing, anti-aliasing, chrominance signal format conversion, edge padding, color blending, etc. The HDVICP coprocessors are designed to perform computational operations required for video encoding and/or decoding such as motion estimation, motion compensation, intra-prediction, transformation, inverse transformation, quantization, and inverse quantization. Further, the distinct circuitry in the HDVICP coprocessors that may be used for specific computation operations is designed to operate in a pipeline fashion under the control of the ARM subsystem and/or the DSP subsystem.

Other Embodiments

While the invention has been described with respect to a limited number of embodiments, those skilled in the art, having benefit of this disclosure, will appreciate that other embodiments can be devised which do not depart from the scope of the invention as disclosed herein.

For example, in some embodiments, filter sizes larger or smaller than the 7-tap, 8-tap, and 4-tap interpolation filters mentioned herein may be used.

In another example, in some embodiments with a pipelined encoder architecture, rather than measuring the consumed VMA bandwidth as part of motion compensation and providing bandwidth control information to motion estimation, the consumed VMA bandwidth may be measured as part of motion estimation to avoid pipeline delay in adjusting the bandwidth control information for motion estimation.

In another example, rather than having a single VMA memory bandwidth rate for each profile/level and a single VMA bandwidth measurement algorithm as previously described, a video coding standard may specify multiple reference block caching models, each with a VMA bandwidth measure algorithm based on the particular caching model. In such embodiments, multiple VMA memory bandwidth rates may be specified for each profile/level, one for each algorithm.

In another example, rather than including the computation of VMA memory bandwidth consumption and the adjustment of motion estimation parameters as part of motion compensation in an encoder, the VMA bandwidth computation and/or adjustment of motion estimation parameters may be performed by a coding control component that runs the main control loop for video encoding.

Embodiments of the methods, encoders, and decoders described herein may be implemented in hardware, software, firmware, or any combination thereof. If completely or partially implemented in software, the software may be executed in one or more processors, such as a microprocessor, application specific integrated circuit (ASIC), field programmable gate array (FPGA), or digital signal processor (DSP). The software instructions may be initially stored in a computer-readable medium and loaded and executed by a processor. In some cases, the software instructions may also be sold in a computer program product, which includes the computer-readable medium and packaging materials for the computer-readable medium. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

Although method steps may be presented and described herein in a sequential fashion, one or more of the steps shown in the figures and described herein may be performed concurrently, may be combined, and/or may be performed in a different order than the order shown in the figures and/or described herein. Accordingly, embodiments should not be considered limited to the specific ordering of steps shown in the figures and/or described herein.

It is therefore contemplated that the appended claims will cover any such modifications of the embodiments as fall within the true scope of the invention.

The invention claimed is:

1. A system comprising:
a processor configured to receive a video sequence and transform the video sequence into coding units; and
an encoder configured to:
encode the coding units into a compressed video stream;
determine a target memory bandwidth for the compressed video stream that is less than a maximum bandwidth;
signal the target memory bandwidth in the compressed video stream; and
impose the target memory bandwidth on the compressed video stream.

2. The system of claim 1, wherein:
the encoder is configured to encode the coding units into the compressed video stream based on a profile;
the profile includes a plurality of levels; and
the encoder is configured to select one of the plurality of levels to encode the coding units into the compressed video stream.

3. The system of claim 2, wherein:
each of the plurality of levels specifies a respective maximum bandwidth.

4. The system of claim 1, wherein:
the coding units are largest coding units.

5. The system of claim 1, further comprising:
a decoder configured to receive the compressed video stream and verify that a bandwidth of the compressed video stream does not exceed the target memory bandwidth.

6. The system of claim 1, wherein:
the encoder determines the target memory bandwidth based on representative video sequences.

7. The system of claim 1, wherein:
the encoder determines the target memory bandwidth based on tracking a bandwidth actually met in a previously encoded video sequence.

8. The system of claim 1, wherein the encoder is configured to signal the target memory bandwidth in the compressed video stream if the target memory bandwidth is less than the maximum bandwidth.

9. A method comprising:
transforming, by a processor, a video sequence into coding units;
encode, by an encoder coupled to the processor, the coding units into a compressed video stream;
determining, by the encoder, a target memory bandwidth for the compressed video stream that is less than a maximum bandwidth;
signaling, by the encoder, the target memory bandwidth in the compressed video stream; and
verifying, by the encoder, a bandwidth of the compressed video stream does not exceed the target memory bandwidth.

10. The method of claim 9,
wherein encoding the coding units into the compressed video stream is based on a profile,
wherein the profile includes a plurality of levels, and
wherein the method further comprises selecting one of the plurality of levels to encode the coding units into the compressed video stream.

11. The method of claim 10, wherein each of the plurality of levels specifies a respective maximum bandwidth.

12. The method of claim 9, wherein the coding units are largest coding units.

13. The method of claim 9, wherein determining the target memory bandwidth is based on representative video sequences.

14. The method of claim 9, wherein determining the target memory bandwidth is based on tracking a bandwidth actually met in a previously encoded video sequence.

15. The method of claim 9, wherein further comprising signaling the target memory bandwidth in the compressed video stream if the target memory bandwidth is less than the maximum bandwidth.

* * * * *